United States Patent [19]
James et al.

[11] Patent Number: 6,073,225
[45] Date of Patent: Jun. 6, 2000

[54] METHOD AND APPARATUS FOR MONITORING BUS TRANSACTIONS BASED ON CYCLE TYPE AND MEMORY ADDRESS RANGE

[75] Inventors: Larry C. James, West Columbia; Peter Washington, Little Mountain, both of S.C.

[73] Assignee: Intel Corporation, Santa Clara, Calif.

[21] Appl. No.: 08/881,414

[22] Filed: Jun. 24, 1997

[51] Int. Cl.[7] ................................................ G06F 12/00
[52] U.S. Cl. ................................. 711/202; 711/148
[58] Field of Search .................................. 711/148, 202, 711/163, 156; 395/800.37, 487, 200.45, 200.16, 181, 183.04; 371/21.1

[56] References Cited

U.S. PATENT DOCUMENTS

| | | | |
|---|---|---|---|
| 4,426,681 | 1/1984 | Bacot et al. | 711/130 |
| 5,175,834 | 12/1992 | Sawai | 395/425 |
| 5,193,172 | 3/1993 | Arai et al. | 395/425 |
| 5,247,687 | 9/1993 | Eilert et al. | 395/775 |
| 5,394,537 | 2/1995 | Courts et al. | 395/425 |
| 5,504,872 | 4/1996 | Tanaka | 395/413 |
| 5,537,536 | 7/1996 | Groves | 395/183.04 |
| 5,566,324 | 10/1996 | Kass | 395/487 |
| 5,596,756 | 1/1997 | O'Brien | 395/750.08 |
| 5,596,765 | 1/1997 | Baum et al. | 395/800.38 |
| 5,613,071 | 3/1997 | Rankin et al. | 395/200.16 |
| 5,710,907 | 1/1998 | Hagersten et al. | 711/148 |
| 5,727,150 | 3/1998 | Laudon et al. | 395/200.45 |
| 5,734,922 | 3/1998 | Hagersten et al. | 395/800.37 |
| 5,809,035 | 9/1998 | Sikdar et al. | 371/21.1 |
| 5,826,058 | 10/1998 | Hartvigsen et al. | 395/500.41 |
| 5,845,331 | 12/1998 | Carter et al. | 711/163 |
| 5,864,653 | 1/1999 | Tavallaei et al. | 714/2 |
| 5,897,656 | 4/1999 | Vogt et al. | 711/141 |

*Primary Examiner*—Do Hyun Yoo
*Assistant Examiner*—Nasser Moazzami
*Attorney, Agent, or Firm*—Blakely, Sokoloff, Taylor & Zafman LLP

[57] ABSTRACT

Memory controller logic for concurrently obtaining memory access locality information by cycle type for a large number of contiguous sections of system memory (pages) for the purposes of optimizing memory and process assignments in a multiple-node NUMA architecture computer system including a distributed system memory. Page access monitoring logic is included within each processing node which contains a portion of shared system memory. This page access monitoring logic maintains a plurality of page access counters, each page access counter corresponding to a different memory page address within the shared system memory. The monitoring logic further includes a programmable cycle control register and comparison logic to condition the page access counters for specific memory cycle types, such as coherency cycles, reads, writes, copyback cache cycles, etc. Whenever the processing node generates a transaction requiring access to a memory address within system memory which matches the cycle type specified in the cycle control register, the page access monitoring logic increments a count value contained within the page access counter corresponding to the memory address to which access is sought. Thus, a record of memory access patterns by cycle type is created which can be used to optimize memory and process assignments in the computer system.

14 Claims, 5 Drawing Sheets

METHOD AND APPARATUS FOR MONITORING BUS TRANSACTIONS BASED ON CYCLE TYPE AND MEMORY ADDRESS RANGE

The present invention relates to Non-Uniform Memory Access (NUMA) computer systems and, more particularly, to methods for optimizing memory and process assignments in NUMA computer systems.

BACKGROUND OF THE INVENTION

Multiprocessor computer systems can be generally divided into two categories: systems containing multiple processors having a shared common memory or having unshared distributed memories. Systems organized so that all processors have equal access to peripheral devices and shared memory are known as symmetric multiprocessing (SMP) systems. The processors within an SMP system may be connected to peripherals, shared memory and each other through a common bus, a bus hierarchy, a crossbar switch or a multistage network. In addition, the shared system memory may consist of multiple memory elements residing at different locations within the system or network.

In many of the SMP systems referred to above, the interconnection path between the various processors and memory elements may vary, resulting in different memory access times, or memory latencies, for each processor-memory combination. Access to "close" memory (for example, memory packaged on the same board as the processor) is much faster than "distant" memory (memory packaged on another processor board). In classic SMP designs employing uniform memory access (UMA), access to memory is uniformly governed by the speed of distant accesses. Memory access times are established to provide each processor with equal access time to system memory.

In a non-uniform memory access (NUMA) computer architecture, memory access latencies are allowed to differ depending on processor and memory locations. All processors in a NUMA system continue to share system memory, but the time required to access memory varies, i.e., is non-uniform, based on the processor and memory location. The main advantage of NUMA SMP designs over other alternatives to UMA SMA architectures is that, to an application or programmer, the NUMA memory model still appears as traditional SMP shared memory. As a result, NUMA systems can run existing SMP applications without modifications.

In a system wherein processors and system memory are organized into two or more nodes, such as the system illustrated in FIG. 1, discussed below, performance of a particular processor is always best if it accesses memory from its own local node rather than from a more remote node. A determination of memory access patterns of all nodes in a multi-node computer system facilitates a remapping of memory pages and processes to processors in order to optimize system performance. A determination of memory activity by cycle type, such as coherency cycles, reads, writes, copyback cache cycles, etc., provides for further refinements and improvements in the mapping of memory pages and processes to processors within a NUMA computer system.

OBJECTS OF THE INVENTION

It is therefore an object of the present invention to provide a new and useful method for determining system memory page access patterns by cycle type in NUMA multiprocessor computer systems.

It is another object of the present invention to provide such a method implemented in hardware within a NUMA multiprocessor computer system.

It is yet another object of the present invention to provide a new and useful method and apparatus for monitoring system bus transactions in a NUMA multiprocessor computer system to monitor memory page access patterns and access cycle types in order to optimize mapping of memory pages and processes to processors within the multiprocessor system.

SUMMARY OF THE INVENTION

There is provided, in accordance with the present invention, a multiprocessor computer system comprising a plurality of processing nodes; a shared, distributed system memory; and a communication pathway connecting the plurality of processor nodes. Each processing node within the system includes a processor bus; at least one processor connected to the processor bus; a portion of the shared system memory; and a memory controller coupling the processor bus and communication pathway to the processing node portion of shared memory. The memory controller includes a plurality of page access counters, each page counter corresponding to a different memory page address within the shared system memory; and page access monitoring logic for reading from the processor bus cycle type information and memory page addresses associated with transactions placed unto the bus. The monitoring logic further includes a programmable cycle control register and comparison logic to condition the page access counters for specific memory cycle types, such as coherency cycles, reads, writes, copyback cache cycles, etc. Whenever a transaction requiring access to a memory address within system memory which matches the cycle type specified in the cycle control register, the page access monitoring logic increments a count value contained within the page access counter corresponding to the memory address to which access is sought.

In the described embodiment, the page access monitoring logic also includes an interval timer and maximum count register, providing two methods for controlling the period for which the monitoring logic operates to collect page access information. The interval timer can be used to define a set time period for which the system memory page access monitoring logic operates to increment the values maintained within the page access counters. Alternatively, the maximum count register can be preloaded with a maximum page access count value, which is the number of page accesses permitted to any page address within said shared memory. Once a page access counter reaches this maximum page access count value, sampling is halted.

The above and other objects, features, and advantages of the present invention will become apparent from the following description and the attached drawings.

DETAILED DESCRIPTION OF THE PREFERRED EMBODIMENT

Figure 1:
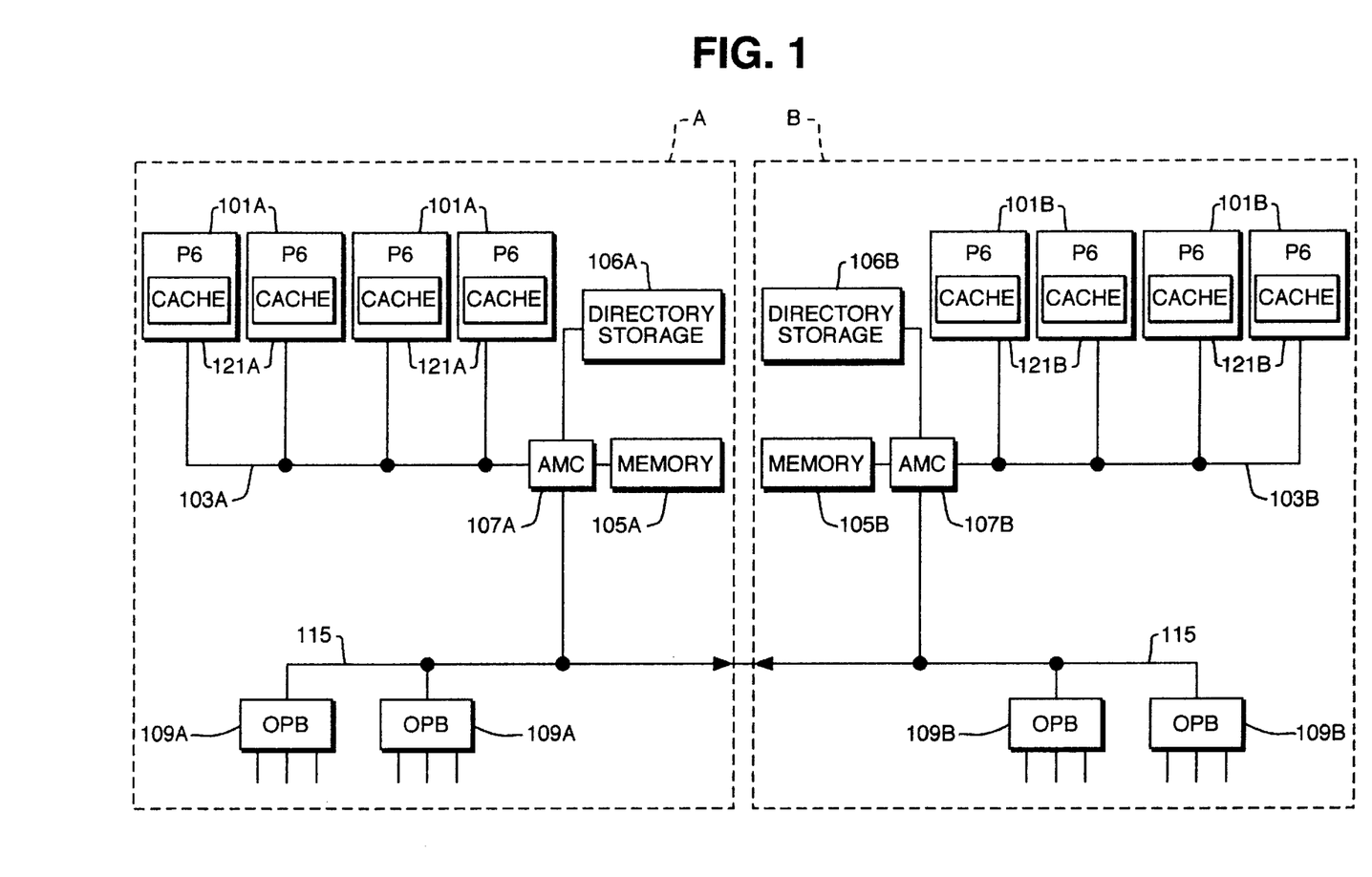
FIG. 1 is a simple block diagram representation of an eight-processor super high volume (SHV) symmetric multiprocessing (SMP) computer system employing a non-uniform memory access (NUMA) architecture.

Referring now to FIG. 1, there is seen an eight-processor SMP system formed of two four-processor building blocks or complexes, identified by reference numerals A and B. Each complex is seen to include identical structure and components, which are identified by reference numerals ending in either an A or a B, for complex "A" and "B", respectively.

The portion of the system contained in complex A is seen to include up to four processors 101A connected to a high-bandwidth split-transaction processor bus 103A. Associated with each processor 101A is a cache memory 121A. A system memory 105A is connected to bus 103A through an advanced dual-ported memory controller 107A. The processor bus 103A is connected to the first port of memory controller 107A. The second memory controller port connects to a high bandwidth I/O bus 115, also referred to herein as an expansion bus, which provides connection for multiple PCI I/O interfaces 109A. All of these components, with the exception of advanced memory controller 107A, are currently available commodity components. For example, processors 101A may be Intel Pentium Pro processors and busses 103A and 115 may be Pentium Pro (P6) bus topology.

The advanced memory controller (AMC) 107A manages control and data flow in all directions between processor bus 103A and I/O bus 115. The I/O bus may contain P6 to PCI I/O Bridges and another AMC ASIC for connectivity to another processor bus, as will be discussed below. The AMC 107A also controls access to a coherent DRAM memory array 105A.

As stated earlier, complex B has a construction identical to complex A. The two complexes are interconnected by expansion bus 115, allowing for communication between the processors 10A and 101B, system memories 105A and 105B, as well as shared I/O devices, cache memories, and other components.

Communication between any one of processors 101A and "close" system memory 105A is provided through processor bus 103A and memory controller 107A, however the communication pathway between any one of processors 101A and "distant" system memory 105B is less direct. The communication pathway between any one of processors 101A and system memory 105B includes processor bus 103A, memory controller 107A, I/O bus 115, and memory controller 107B. Obtaining use of these communication pathway elements will normally result in greater memory access latencies when one of processors 101A requires access to system memory 105B rather than system memory 105A. Similarly, greater memory access latencies should be expected when one of processors 101B requests access to system memory 105A rather than system memory 105B.

Each memory controller 107A and 107B includes logic for monitoring transactions between the local processors 101A and 101B, respectively, and system memory. The monitoring logic, shown in FIG. 2, successively examines memory addresses which appear on the local processor bus, either bus 103A or 103B, to construct a table or histogram which correlates a count of memory page accesses with each page address within a monitored address range occurring within a predefined sample time period.

Figure 2:
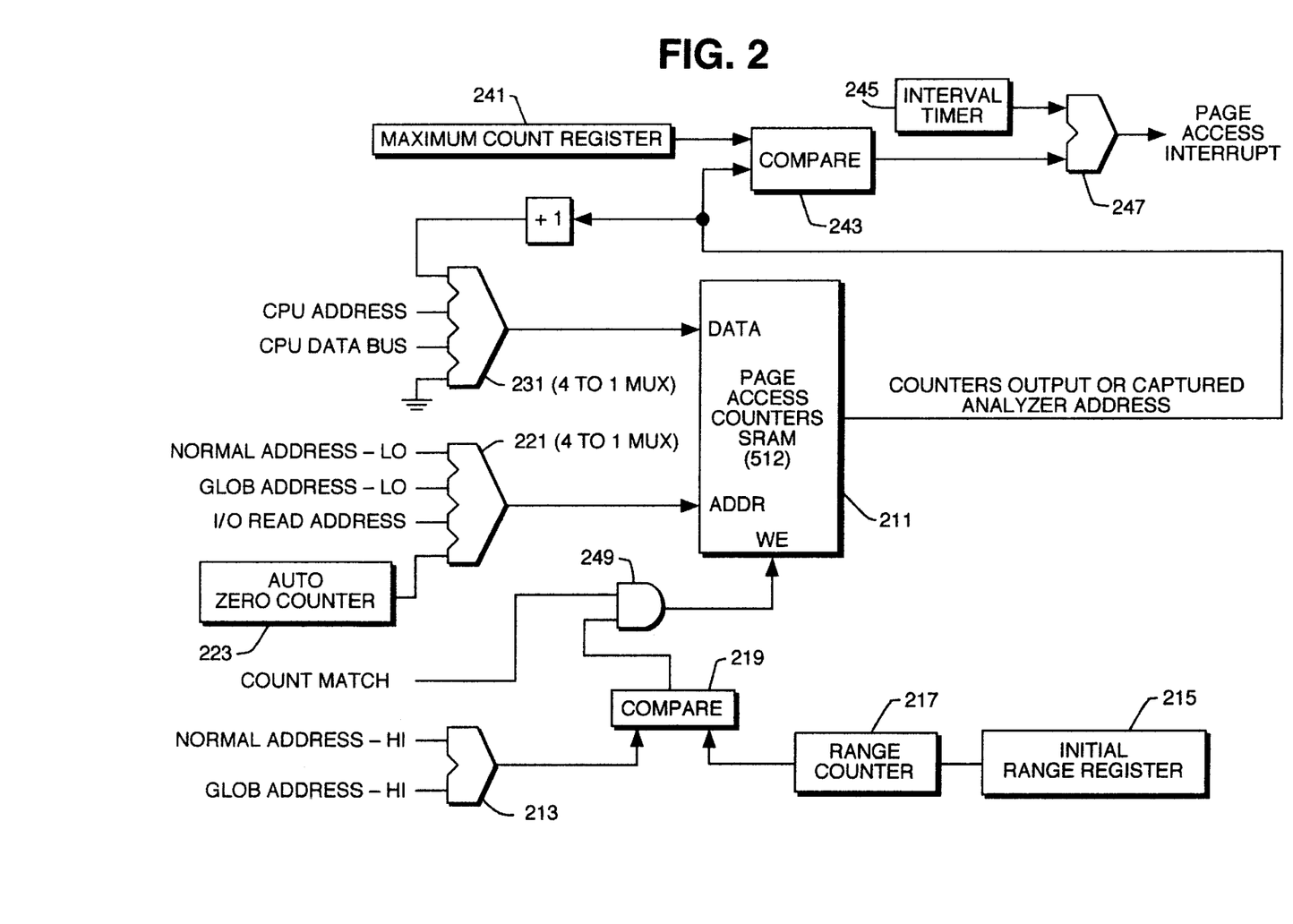
FIG. 2 is a simple block diagram representation of a portion of logic hardware contained within the memory controllers shown in FIG. 1 for monitoring page accesses by cycle type in accordance with the present invention.

The principal elements of the page access monitoring logic shown in FIG. 2 include a set of page access counters which are implemented with a 512-entry SRAM 211. Within SRAM 211, each page access counter counts the number of accesses to a specific address range (page), and the set of counters operate over a contiguous group of addresses. A separate programmable range register 215 defines the range of addresses to be counted. An interval timer counter 245 is implemented to determine the duration of a sample. Also, a programmable maximum count register 241 is provided to determine when to terminate counting as described below.

The monitoring logic further includes a first 2:1 multiplexer 213. Two inputs are provided to multiplexer 213: a normal address, and a glob address, either of which may be selected to be the output of multiplexer 213. The outputs of multiplexer 213 and initial range register 215 are provided to a compare logic circuit 219, the output of which is provided through an AND gate 249 to a write enable (WE) input of SRAM 211.

A first 4:1 multiplexer 221 is connected to provide an address to an address select input (ADDRS) of SRAM 211. Four input signals are provided to multiplexer 221: a normal address, a glob address, a configuration I/O read address, or the output of a zero counter 223.

Output of a second 4:1 multiplexer 231 is connected to the data input (DATA) of SRAM 211. Four input signals are provided to multiplexer 231: a processor address, data from the processor data bus, the output of SRAM 211 incremented by one, or a zero data value.

The output of SRAM 211 and the output of maximum count register 241 are provided to a compare logic circuit 243. The output of compare logic circuit 243 and interval timer 245 are provided to a second 2:1 multiplexer 247.

Prior to the start of monitoring operation, range register 215 is programmed for the desired base range of memory pages to monitor. When the page access monitor logic is initially enabled, all the page access counters are reset to a value of zero. In the implementation shown using SRAM 211, each location within SRAM 211 is sequentially accessed through operation of zero counter 223 and set to a value of zero. Monitoring of bus activity begins.

The address of the active transaction on the processor bus selects a unique page access counter, and the contents of the counter are incremented if the address is in the range specified by range register 215. Every transaction on the system bus that is within the range specified by the range register will increment a specific page access counter. The page access counter typically corresponds to an address range equal to the page size of the operating system, but could be of any granularity. The current implementation has two page size selections: a standard page size of 4K bytes and a 2 Mbytes page size. The larger page size mode, referred to as "Glob Page Mode" is used to perform a quick search of memory for most active sections.

Figure 3:
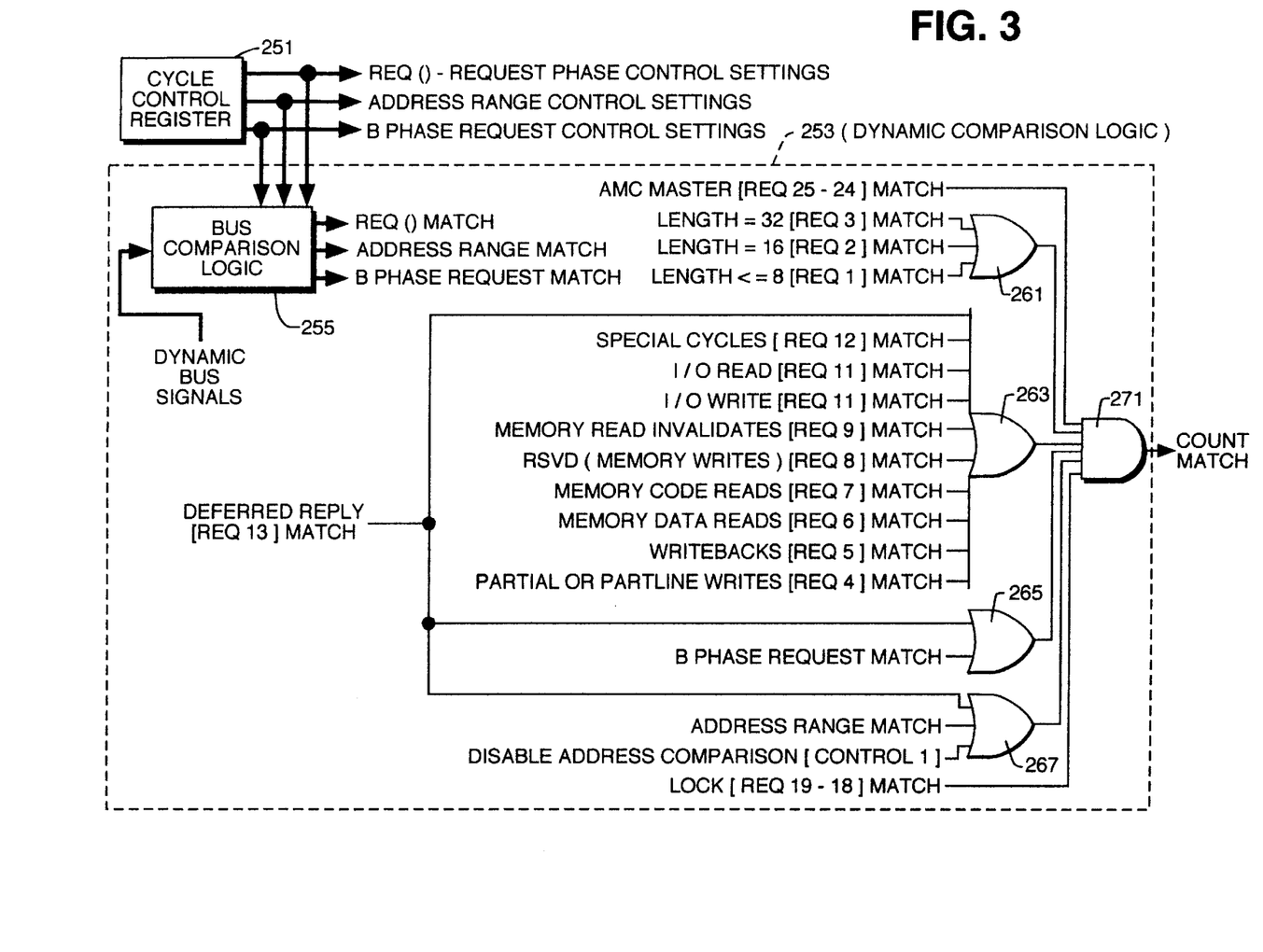
FIG. 3 is a simple block diagram representation of logic hardware for selecting the page access cycle type to be monitored by the logic of FIG. 2 in accordance with the present invention.

Logic hardware for selecting the page access cycle type to be monitored is shown in FIG. 3. The output of the logic of FIG. 3, labeled COUNT MATCH, is provided as a second input to AND gate 249, shown in FIG. 2. The logic shown in FIG. 3 includes a programmable cycle control register 251 and dynamic bus comparison logic 255 to condition the page access counters for specific memory cycle types. The Cycle Control Register 251 contains control bits for each type of cycle for which it is desirable to count based on the cycle type. Bus comparison logic 255 receives request command and control information from the processor bus for the active transaction placed on the processor bus. The received request command and control information is compared with the control bits saved in register 251 to generate a plurality of address, cycle type and control match signals. These signals are thereafter provided as inputs to four OR gates 261, 263, 265 and 267. The outputs of the four OR gates together with an AMC MASTER (REQ 25-24) MATCH signal, are provided as inputs to an AND gate 271 which generates the COUNT MATCH signal provided to AND gate 249 shown in FIG. 2.

The match signals identified in FIG. 3 are grouped as inputs to OR gates 261, 263, 265 and 267 so that at least one signal from each group must indicate a match between the request command and control signals received from the processor bus and the cycle bit information stored in register 251 in order to generate a valid COUNT MATCH signal to enable the count logic of FIG. 2.

The page access monitoring logic, as shown in FIGS. 2 and 3 supports two modes of operation: a timed sample mode and a maximum count sample mode. In the timed mode of operation, the interval timer will cause an interrupt and stop the counters following a preset sampling period programmed into the interval timer. Interrupt service routine software can then read the contents of the page access counters into system memory. A new range register value can then be programmed to monitor a new range of pages to be sampled. This process can be continued for all memory locations. The collected history of memory activity can thereafter be reviewed to determine how to physically map memory or allocate processes to processors to run specific processes in order to reduce memory latencies and optimize system operation.

Figure 4:
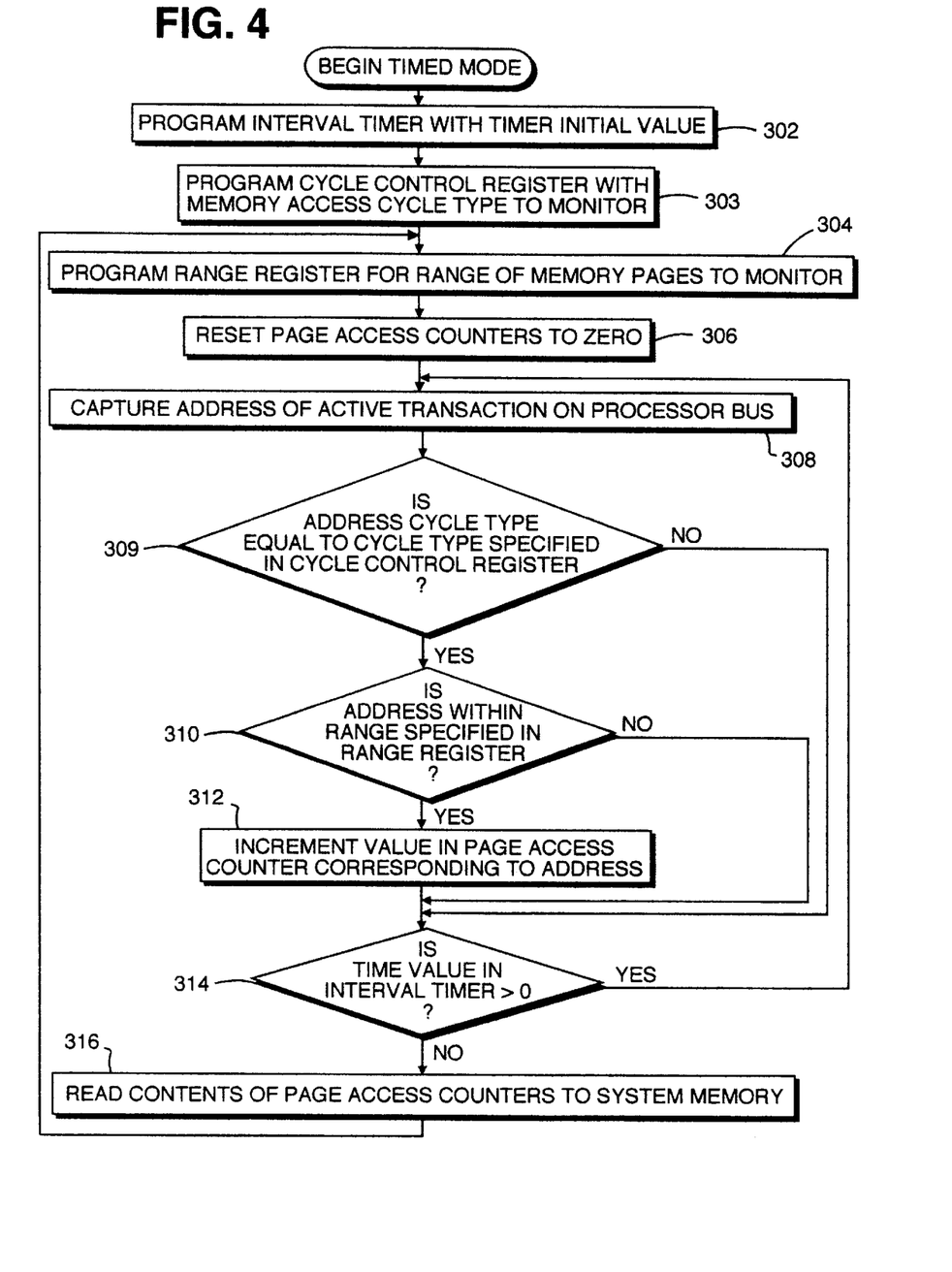
FIG. 4 is a flow diagram illustrating a "timed" mode of operation of the cycle type page access monitoring logic shown in FIGS. 2 and 3.

Referring to FIG. 4, a flow diagram for operation of the page access monitor control logic in timed sample mode in accordance with the present invention is shown. At the initiation of the timed sample mode of operation, interval timer 245 is preloaded with an interval timer initial value (step 302) which is the number of bus clocks before an interrupt is generated by the monitoring logic indicating the end of a sample period. Cycle Control Register 251 is programmed with the type of cycle, e.g. Reads, Writes, Coherency, Modified Reads or Writes, Shared Reads or Writes, Copyback cache cycles, etc., which is to be counted by the Page Access Counters (step 303). Range register 215 is also programmed with an address value which defines the group of pages to be monitored (step 304). This address value corresponds to address bits A35 to A21 of the physical address. In the glob page mode, only address bits A35 to A30 are used. Also at this time, the page access counters are reset to each contain a zero count (step 306).

Monitoring transpires with the successive capture of addresses for active transactions as they are presented on the processor bus (step 308). Following the capture of an address, the cycle type of the captured address is compared with the type specified in cycle control register 251 (step 309) and the captured address is compared with the range of addresses specified by range register 215 (step 310). If the cycle type matches and the captured address is within the range of addresses specified by the range register, than the page counter contained within SRAM 211 corresponding to the captured address is incremented by one (step 312). If the captured address is not found to be included in the range of monitored addresses, no additional action takes place concerning the captured address.

Steps 308 through 312 are repeated for successive addresses captured from the processor bus as long as time remains in interval timer 245, as indicated by decision block 314. Once the value held within interval timer 245 has decremented to zero, the interval timer will generate an interrupt signal indicating that the sampling for the range of page addresses currently specified by range register 215 has been completed. Interrupt service routine software can then read the contents of the page access counters into system memory (step 316). A new range register value can then be programmed into range register 215, and the page counters again reset to zero, to allow a new range of pages to be sampled. The process illustrated in steps 308 through 316 will then be repeated for this new range, as well as for subsequent ranges of page addresses until all memory locations have been sampled. The collected history of memory activity can thereafter be reviewed to determine how to physically map memory or allocate processes to processors to run specific processes in order to reduce memory latencies and optimize system operation.

The second mode of operation of the page access monitoring logic, the maximum count sample mode, monitors processor bus activity until a particular page access counter exceeds a value programmed into the maximum count register 241. The interval timer can be also read to determine how long it took for the maximum count to occur. This mode is especially useful for monitoring a specific remote address range to determine if access rates are too high. The interrupt rate would be generally less than in the timed mode.

Figure 5:
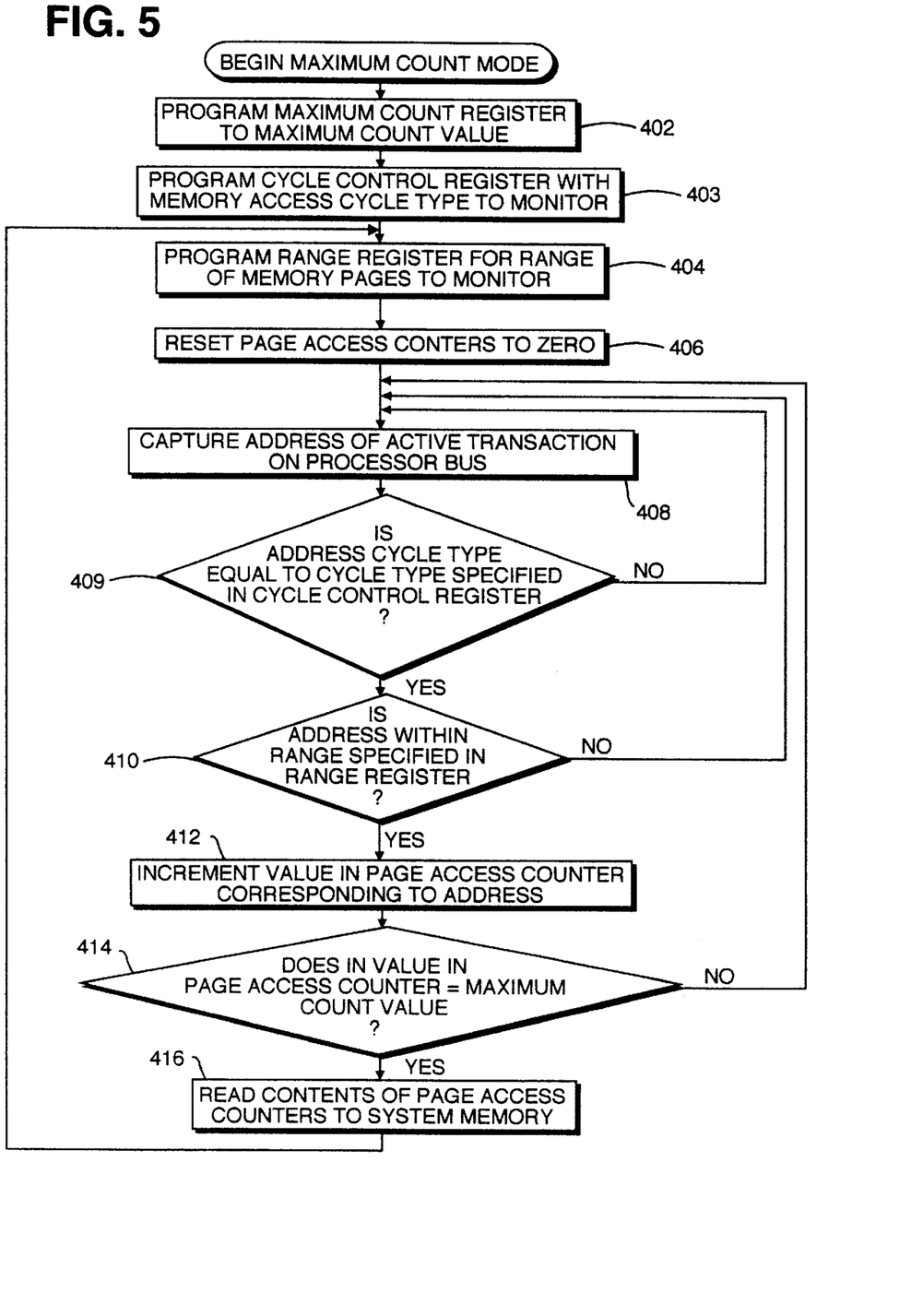
FIG. 5 is a flow diagram illustrating a "maximum count" mode of operation of the cycle type page access monitoring logic shown in FIGS. 2 and 3.

The maximum count sample mode of operation of the page access monitoring logic is illustrated in the flow diagram of FIG. 5. At the initiation of the maximum count sample mode of operation, maximum count register 241 is loaded with a maximum page access count value (step 402) which is the number of page accesses permitted to a particular page address before an interrupt is generated by the monitoring logic indicating the end of a sample period. Cycle Control Register 251 is programmed with the type of cycle, e.g. Reads, Writes, Coherency, Modified Reads or Writes, Shared Reads or Writes, Copyback cache cycles, etc., which is to be counted by the Page Access Counters (step 403). Range register 215 is also programmed with an address value which defines the group of pages to be monitored (step 404). Also at this time, the page access counters are reset to each contain a zero count (step 406).

Monitoring transpires with the successive capture of addresses for active transactions as they are presented on the processor bus (step 408). Following the capture of an address, the cycle type of the captured address is compared with the type specified in cycle control register 251 (step 409) and the captured address is compared with the range of addresses specified by range register 215 (step 410). If the cycle type matches and the captured address is within the range of addresses specified by the range register, than the page counter contained within SRAM 211 corresponding to the captured address is incremented by one (step 412). If the captured address is not found to be included in the range of monitored addresses, no additional action takes place concerning the captured address.

Steps 408 through 412 are repeated for successive addresses captured from the processor bus until the count contained within any page access counter grows equivalent to the maximum page access count value contained within maximum count register 241 (step 414). Once this occurs, the page access monitoring logic will generate an interrupt signal indicating that the sampling for the range of page addresses currently specified by range register 215 has been completed. Interrupt service routine software can then read the contents of the page access counters into system memory (step 416). A new range register value can then be programmed into range register 215, and the page counters again reset to zero, to allow a new range of pages to be sampled. The process illustrated in steps 408 through 416 will then be repeated for this new range, as well as for subsequent ranges of page addresses until all memory locations have been sampled. The collected history of memory activity can thereafter be reviewed to determine how to physically map memory or allocate processes to processors to run specific processes in order to reduce memory latencies and optimize system operation.

It can thus be seen that there has been provided by the present invention a new and useful method and apparatus for monitoring system bus transactions in a NUMA multiprocessor computer system to monitor memory page access patterns and access cycle types in order to optimize mapping of memory pages and processes to processors within the multiprocessor system.

The comparison logic operates at full system speed and can be programmed for excepting multiple cycle types, e.g. reads or writes, as well as "ANDing" of specific conditions, e.g. modified read cycles. This process can be continued for all memory locations and a history of memory activity can be generated on an OS page basis for any cycle type combination. These counts can be used to evaluate memory access locality by cycle type combinations providing useful clues to system behavior such as where the most coherency traffic is being generated or which pages are causing the most copybacks, etc. This information is useful to determine how to physically map memory or which processors to run specific processes in NUMA architectures.

Although the presently preferred embodiment of the invention has been described, it will be understood that various changes may be made within the scope of the appended claims.

What is claimed is:

1. A method comprising:
receiving a first cycle type of bus transactions to be monitored;
receiving a first range of memory addresses to be monitored;
receiving at least one of a second cycle type of bus transactions to be monitored and a second range of memory addresses to be monitored;
capturing a first bus transaction in a shared memory system; and
updating a record of bus transactions if a cycle type of the captured bus transaction is one of the first cycle type and the second cycle type, if any, and if an address of the captured bus transaction is one of within the first range of memory addresses, if and the second range of memory address, if any, said record of bus transactions to facilitate re-mapping of memory contents in the shared memory system.

2. The method of claim 1 further comprising:
repeating the capturing and updating for a plurality of additional bus transactions.

3. The method of claim 2 wherein the record of bus transactions maintains a count of bus transactions based on addresses, the method further comprising:
terminating the repeating upon reaching a maximum count of bus transactions.

4. The method of claim 2 further comprising:
terminating the repeating upon expiration of a time interval.

5. The method of claim 1 wherein the updating comprises:
incrementing a counter corresponding to a page of addresses including the address of the captured bus transaction.

6. The method of claim 1 wherein the first bus transaction is a bus transaction in a non-uniform memory access (NUMA) symmetric multiprocessing (SMP) system.

7. A method comprising:
receiving a first cycle type of bus transactions to be monitored wherein the first cycle type is one of a read cycle, a write cycle, a coherency cycle, and a copyback cache cycle;
receiving a first range of memory addresses to be monitored;
capturing a first bus transaction in a shared memory system; and
updating a record of bus transactions if a cycle type of the captured bus transaction is of the first cycle type and an address of the captured bus transaction is within the first range of memory addresses, said record of bus transactions to facilitate re-mapping of memory contents in the shared memory system.

8. An apparatus comprising:
a first register to receive a first cycle type of bus transactions to be monitored;
a second register to receive a first range of memory addresses to be monitored, at least one of said first and second registers to receive at least one of a second cycle type and a second range of memory addresses respectively;
first logic to capture a first bus transaction in a shared memory system; and
second logic to update a record of bus transactions if a cycle type of the captured bus transaction is one of the first cycle type and the second cycle type, if any, and if an address of the given captured bus transaction is one of within the first range of memory addresses and the second range of memory addresses, if any, said record of bus transactions to facilitate re-mapping of memory contents in the shared memory system.

9. The apparatus of claim 8 wherein:
the first logic is to capture a plurality of additional bus transactions; and
the second logic is to update the record of bus transactions for respective ones of the plurality of additional bus transactions.

10. The apparatus of claim 9 wherein the record of bus transactions maintains a count of bus transactions based on addresses, the apparatus further comprising:
third logic to interrupt the second logic upon reaching a maximum count of bus transactions.

11. The apparatus of claim 9 further comprising:
third logic to interrupt the second logic upon expiration of a time interval.

12. The apparatus of claim 8 wherein the second logic comprises:
a plurality of counters, each counter corresponding to a page of addresses within the first range of memory addresses, and
incrementing logic to increment a counter of the plurality of counters corresponding to a page of addresses including the address of the captured bus transaction.

13. The apparatus of claim 7 wherein the first bus transaction is a bus transaction in a non-uniform memory access (NUMA) symmetric multiprocessing (SMP) system.

14. An apparatus comprising:
- a first register to receive a first cycle type of bus transactions to be monitored wherein the first cycle type is one of a read cycle, a write cycle, a coherency cycle, and a copyback cache cycle;
- a second register to receive a first range of memory addresses to be monitored;
- first logic to capture a first bus transaction in a shared memory system; and
- second logic to update a record of bus transactions if a cycle type of the captured bus transaction is of the first cycle type and an address of the captured bus transaction is within the first range of memory addresses, said record of bus transactions to facilitate re-mapping of memory contents in the shared memory system.

* * * * *